United States Patent
Quan

(10) Patent No.: US 6,421,497 B1
(45) Date of Patent: *Jul. 16, 2002

(54) METHOD FOR LOCATING COPY PROTECTION PULSES WITHIN SELECTED VIDEO LINES OF A VIDEO SIGNAL

(75) Inventor: Ronald Quan, Cupertino, CA (US)

(73) Assignee: Macrovision Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/414,747

(22) Filed: Oct. 8, 1999

Related U.S. Application Data

(62) Division of application No. 08/733,302, filed on Oct. 17, 1996, now Pat. No. 6,002,830.
(60) Provisional application No. 60/005,681, filed on Oct. 17, 1995.

(51) Int. Cl.[7] ................................................. H04N 5/76
(52) U.S. Cl. .............................. 386/1; 386/94; 360/60; 380/203; 380/204; 380/224
(58) Field of Search ........................ 386/1, 94; 360/60; 380/201, 203, 204, 224, 22; H04N 5/76, 9/79, 5/92

(56) References Cited

U.S. PATENT DOCUMENTS

| | | | | |
|---|---|---|---|---|
| 4,571,615 A | * | 2/1986 | Robbins et al. ............. | 380/222 |
| 4,631,603 A | * | 12/1986 | Ryan ........................... | 360/60 |
| 4,695,901 A | * | 9/1987 | Ryan ........................... | 380/15 |
| 4,907,093 A | * | 3/1990 | Ryan ............................. | 380/5 |
| 5,157,510 A | * | 10/1992 | Quan et al. ..................... | 380/3 |
| 5,179,452 A | * | 1/1993 | Takahashi .................... | 380/15 |
| 5,194,965 A | * | 3/1993 | Quan et al. ..................... | 380/5 |
| 5,315,448 A | * | 5/1994 | Ryan ........................... | 360/60 |
| 5,625,691 A | * | 4/1997 | Quan ............................. | 380/5 |
| 5,633,927 A | * | 5/1997 | Ryan et al. ..................... | 380/5 |
| 5,748,733 A | * | 5/1998 | Quan ............................. | 380/5 |
| 5,784,523 A | * | 7/1998 | Quan et al. ..................... | 386/94 |
| 5,883,959 A | * | 3/1999 | Kori ............................. | 380/5 |
| 6,002,830 A | * | 12/1999 | Quan ............................. | 386/1 |
| 6,058,191 A | * | 5/2000 | Quan ......................... | 380/203 |
| 6,173,109 B1 | * | 1/2001 | Quan ............................. | 386/1 |

* cited by examiner

*Primary Examiner*—Thai Tran
(74) *Attorney, Agent, or Firm*—George Almeida

(57) ABSTRACT

In a known copy protection process for preventing recording of video signals, pseudo sync and AGC pulses are present on predetermined lines within the blanking intervals of the video signal so that any subsequent video tape recording of the video signal shows a picture of very low entertainment quality. This copy protection process is defeated first by determining the location of the video lines containing the copy protection using the color burst signal or chroma in the horizontal blanking interval to determine on-line detection. Then some or all of the lines including copy protection signals are modified so as to render the overall video signal recordable. The modification is accomplished in a number of ways, including gain shifting portions of the video signal, level shifting portions of the video signal, bandwidth limiting certain portions of the video signal or replacing certain portions of the video signal with other video elements.

9 Claims, 9 Drawing Sheets

Detail. X-X

METHOD FOR LOCATING COPY PROTECTION PULSES WITHIN SELECTED VIDEO LINES OF A VIDEO SIGNAL

CROSS REFERENCE TO RELATED APPLICATION

This is a Divisional application of copending Prior Application Ser. No. 08/733,302 filed on Oct. 17, 1996, now U.S. Pat. No. 5,002,830.

This application claims the benefit of U.S. Provisional Application No. 60/005,681 filed Oct. 17, 1995.

BACKGROUND OF THE INVENTION

1. Field of the Invention

The present invention pertains to a method and apparatus for processing a video signal, and more particularly to removing (defeating) effects of copy protection signals from a video signal.

2. Description of the Prior Art

U.S. Pat. No. 4,631,603 ('603) by Ryan, issued on Dec. 23, 1986 entitled METHOD AND APPARATUS FOR PROCESSING A VIDEO SIGNAL SO AS TO PROHIBIT THE MAKING OF ACCEPTABLE VIDEO TAPE RECORDINGS THEREOF describes a video signal that is modified so that a television receiver will still provide a normal color picture from the modified video signal while a videotape recording of the modified video signal produces generally unacceptable pictures (incorporated by reference).

The '603 invention relies on the fact that typical videocassette recorder's automatic gain control systems cannot distinguish between the normal sync pulses (including. equalizing or broad pulses) of a conventional video signal and added pseudo-sync pulses. Pseudo-sync pulses are defined here as pulses which extend down to a normal sync tip level and which have a duration of a least 0.5 microseconds. A plurality of such pseudo-sync pulses is added to the conventional video during the vertical blanking interval, and each of such pseudo-sync pulses is followed by a positive pulse of suitable amplitude and duration. As a result, the automatic gain control system in a videotape recorder will make a fake measurement of video level which causes an improper recording of the video signal. The result is unacceptable picture quality during playback.

U.S. Pat. No. 4,819,098 ('098) by Ryan, issued on Apr. 4, 1989 entitled METHOD AND APPARATUS FOR CLUSTERING MODIFICATIONS MADE TO A VIDEO SIGNAL TO INHIBIT THE MAKING OF ACCEPTABLE VIDEOTAPE RECORDING describes a signal modification so that a television monitor receiver still produces a normal picture from the modified signal, whereas a videotape recording of this signal produces generally unacceptable pictures and is incorporated by reference. Videotape recorders have an automatic gain control circuit which measures the sync level in a video signal and develops a gain correction for keeping the video level applied to an FM modulator in the videotape recording system at a fixed, predetermined value. A plurality of positive pulses are added to a video signal with each immediately following a respective trailing edge of a normally occurring sync pulse. These added pulses are clustered at the vertical blanking interval of each field to minimize the affect of the same on the viewability of the picture defined by the signal while still causing the automatic level control circuit in a recorder to assess the video level at many times its actual value. The sync pulses them-selves can also be at a reduced level, in order to enhance the effectiveness of the process.

U.S. Pat. No. 4,695,901 ('901) by Ryan, issued on Oct. 2, 1990 entitled METHOD AND APPARATUS FOR REMOVING PSEUDO-SYNC AND/OR AN AGC PULSES FROM A VIDEO SIGNAL describes removing pseudo-sync pulses and AGC pulses that have been added to a video signal to enable acceptable video recording thereof and is hereby incorporated by reference. The added signals previously interfered with acceptable video recording of the video signal because the automatic gain control of videotape recorders sensed false recording levels, while conventional television receivers were unaffected by those modifications to the video signal. Removal of the added pulses permits acceptable video recording of the previously modified video signal. A selectively-operable clipping circuit is used to remove selected negative-value components (i.e. pseudo-sync pulses)from the video signal, while added AGC pulses are effectively blanked from the video signal with an electrically-operated switch. Both the blanking and clipping functions are selectively achieved by sensing both the normal sync pulses of the video signal and the added pseudo-sync pulses. Method and apparatus are disclosed for "cleaning up" video signals modified by either the pseudo-sync pulses alone, the AGC pulses alone, or combinations thereof.

U.S. Pat. No. 4,336,554 ('554) by Okada et al., issued on Jan. 21, 1992 entitled CODE SIGNAL BLANKING APPARATUS (incorporated by reference) describes a code signal blanking apparatus comprising a switching means operative during a given period of a vertical blanking period of a television signal and a reference level setting means for producing an output of the reference level during said given period when the switching circuit is operative.

U.S. Pat. No. 5,194,965 ('965) by Quan et al., issued on Mar. 16, 1993 entitled METHOD AND APPARATUS FOR DISABLING ANTI-COPY PROTECTION SYSTEM IN VIDEO SIGNALS describes a method and apparatus for disabling the effect of copy-protection signals placed in a recording video signals which is based on differences in the characteristics of television and VCR circuitry and is hereby incorporated by reference. Copy-protect signals include pseudo-sync pulses and/or added AGC pulses in the blanking interval of a video signal. The specific method described includes altering the level of the video signal during the vertical blanking interval, e.g. level-shifting, so as to render the copy-protect signals ineffective to prevent unauthorized copying by a VCR. A circuit for achieving the method includes a sync separator for detecting the vertical blanking interval, pulse generating circuits for producing pulses of predetermined widths during the interval, and a summing circuit for summing the predetermined pulses with copy-protect signals thereby to shift their level. An alternative method includes increasing the effective frequency and/or narrowing of the copy-protect signals during the vertical blanking interval so as to achieve attenuation and/or low-pass filtering in the VCR circuitry to thereby render the signals ineffective in preventing copying. A circuit for achieving this method includes pulse narrowing and/or pulse multiplication circuitry which effectively increases the high-frequency content of the pseudo-sync and/or AGC pulses.

U.S. Pat. No. 5,157,510 ('510) by Quan et al., issued on Oct. 20, 1992 entitled METHOD AND APPARATUS FOR DISABLING ANTI-COPY PROTECTION SYSTEM IN VIDEO SIGNALS USING PULSE NARROWING describes method and apparatus for disabling the effects of copy-protect signals added to a video signal using differences in the characteristics of television and VCR circuitry (incorporated by reference). Copy-protect signals as described include pseudo-sync pulses and/or added AGC pulses in the vertical blanking intervals of a video signal. The specific method described includes increasing the effective frequency of the copy-protect signals during the vertical blanking intervals so as to achieve attenuation and/or low pass filtering in the VCR circuitry to thereby render the signals ineffective in preventing copying. A circuit for achieving this method comprises pulse narrowing and/or pulse multiplication circuitry which effectively increases the high-frequency content of the pseudo-sync and/or AGC pulses.

U.S. Pat. No. 5,625,691 ('691) entitled "VIDEO COPY PROTECTION PROCESS ENHANCEMENT AND VERTICAL PICTURE DISTORTIONS," by Quan issued on Apr. 29, 1997; which is incorporated by reference, discloses defeating the affects of the signal generated by the '603 patent by modifying the relative amplitudes of the pseudo sync pulses to the normal sync pulse so that synchronizing pulse detection system within a recorder will only detect the normal synchronizing pulses, thus permitting normal recording of said copy protection signal.

U.S. Pat. No. 5,633,927 ('927); entitled "VIDEO COPY PROTECTION PROCESS ENHANCEMENT AND VERTICAL PICTURE DISTORTIONS," by Quan issued on May 27, 1997; which is incorporated by reference, discloses various defeat mechanisms the affects of the signal generated by the '603 patent to permit normal recording of said copy protection signal.

U.S. Pat. No. 4,907,093 ('093) entitled "Method and Apparatus for Preventing The Copying of a Video Program," which is incorporated by reference, discloses a method and apparatus for detecting the ordered pairs of pseudo-sync pulses and AGC pulses described in the '603 patent and disabling the recording function of a video cassette recorder. The '093 patent discloses several detection methods.

Additionally, U.S. Pat. No. 4,571,615 ('615) entitled "TIMING GENERATOR FOR SYNC SUPPRESSED TELEVISION SIGNALS," by Robbins et al. issued on Feb. 18, 1986 which is incorporated by reference, discloses a timing signal generator for recovering-timing signals in scrambled video signals in which the synchronizing signals are suppressed including a detector responsive to the color burst or chroma in the horizontal blanking interval signal contained on the back porch of a suppressed horizontal blanking interval. The vertical interval is detected as the absence of color burst or chroma in the horizontal blanking interval for a specified time interval, and horizontal sync information is obtained by the detection of the first color burst or chroma in the horizontal blanking interval after an absence of color burst or chroma in the horizontal blanking interval.

All of the- defeat methods described in the referenced defeat patents use the vertical and horizontal synchronizing pulses to determine the location of the copy protection signals within a copy protected video signal. There is a need for copy protection defeat mechanisms that do not rely on the horizontal and vertical synchronizing pulses to determine the location of the copy protection signals within a copy protected video signal.

SUMMARY

The present invention is directed to a method and apparatus that use the color burst or chroma in the horizontal blanking interval signal to determine the location of the copy protection signals within a copy protected video signal.

The invention contains two basic elements: a method and apparatus for locating the copy protection signals using a color burst or chroma in the horizontal blanking interval signal; and a generic method and apparatus for modifying the copy protection signals in at least some of those lines and/or copy protection pulses whereby an acceptable video recording of the video signal can be made.

The "generic" way of defeating or effectively eliminating the effects of the copy protection pulses is called "Circuit ACP". "Circuit ACP" is controlled by the pseudo sync AGC pulse pixel location circuit that uses the color burst or chroma on the horizontal blanking interval signal as a trigger element as described above.

This "Circuit ACP" eliminates or reduces the effectiveness of the copy protection signals while in the digital domain by: a) Level shifting and/or pulse narrowing and/or pulse attenuation as described in U.S. Pat. No. 4,695,901 ('901) Ryan, U.S. Pat. No. 5,194,965 ('965) and U.S. Pat. No. 5,157,510 ('510) Quan et al. (all referenced above and incorporated by reference); b) Normal composite sync replacement; c) Increased normal composite sync size that is larger in amplitude than the pseudo sync such that sync separators will not detect pseudo syncs (as disclosed in the '965 patent and the '283 application discussed above and both incorporated by reference); d) Replacement of at least part of pseudo AGC locations with a signal (i.e. flat field) such that a recordable copy is possible.

Several different circuits that can be used within "Circuit ACP" are described.

The methods and apparatusses for removing or defeating effects of copy protection signals include modifying less than all of the lines in which the copy protection signals are present, but sufficient of the lines so that the acceptable video recording can be made.

BRIEF DESCRIPTION OF THE DRAWINGS

With reference to the accompanying drawings.

DETAILED DESCRIPTION

Figure 1A:
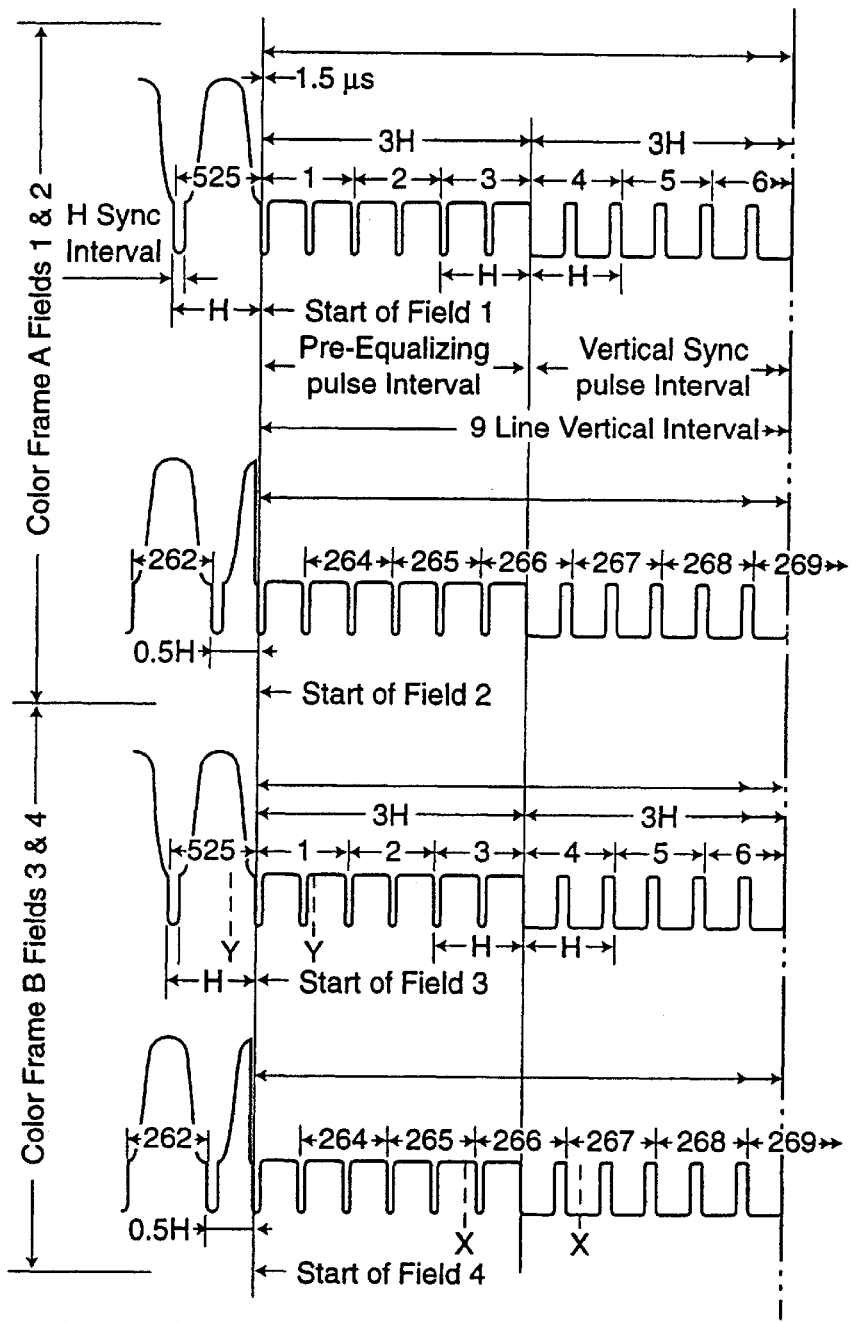
FIGS. 1–1C show the vertical interval of standard NTSC video signal.
Figure 1:
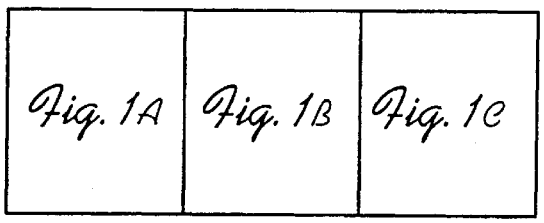

The principal object of the invention is to locate and defeat or reduce the effectiveness of copy protection signals. FIG. 1 shows the vertical interval of standard NTSC video signal. Note that the color burst or chroma in the horizontal blanking interval signal is not present during the first nine lines of each field.

As discussed above there are two basic type of copy protection signals that are commonly present in video signals. The first includes signals in the Vertical Blanking portion of the video signal. The second which will be discussed below includes copy protection signals in the Back Porch portion of the video signal.

Figure 2:
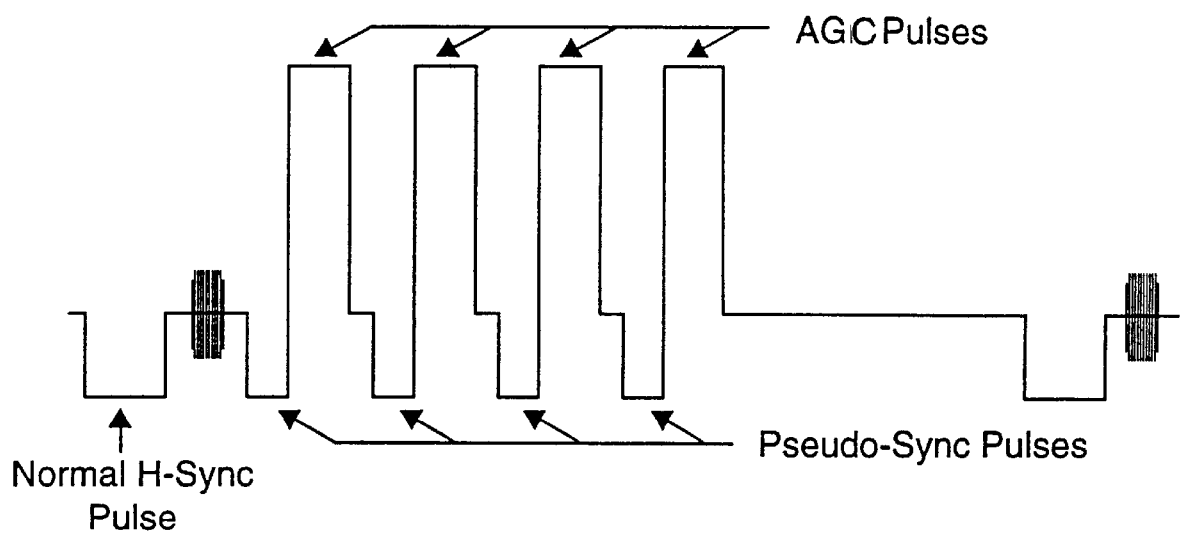
FIG. 2 shows a copy protected signal including pseudo sync pulses and AGC pulses as described in the '603 patent.

FIG. 2 shows a one horizontal line within a vertical blanking interval of the copy protection signal including pseudo sync pulses and AGC pulses as described in the '603 patent. The key element of this signal as described in the '603 patent is the relationship of the pseudo sync pulse with the AGC Pulse. This relationship is the cause of the AGC disturbance in a recorder recording the copy protected signal.

The elements of these copy protection signals are the combination of either a pseudo sync or a regular sync pulse with an AGC pulse. These pairs sync and AGC pulses are designed to cause the AGC circuitry in a recorder to miscalculate the proper gain setting and thus make an inferior recording. The primary object of the embodiments discussed below is to locate the copy protection signal using the Color Burst Signal and to modify a copy protected signal to reduce or eliminate the effects of the copy protection signals.

Figure 3:
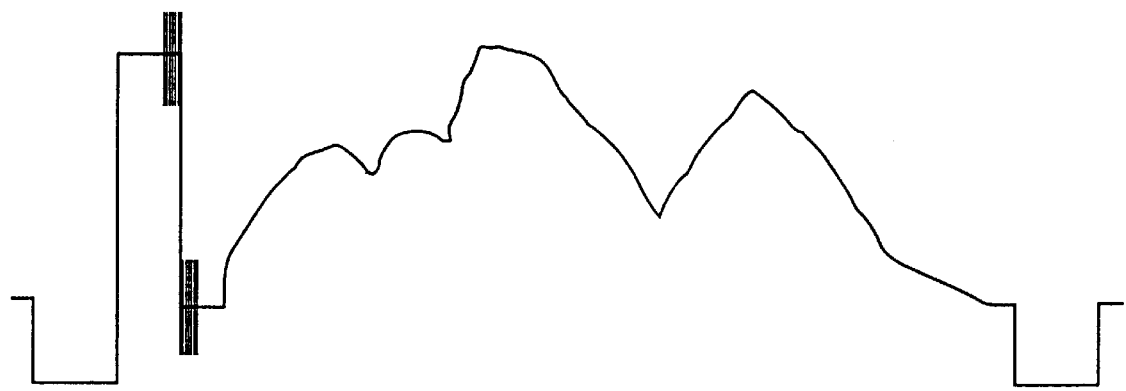
FIG. 3 shows a copy protection signal as described in the '098 patent.

FIG. 3 shows a commercial embodiment of the copy protection signal as described in the '098 patent. This signal is placed on several horizontal lines prior to the pre-equalizing pulses of the vertical interval in each field. The combination of these pulses with the pulses in FIG. 2 increases the effectiveness of the copy protection without reducing the playability of the signal on a display device.

Figure 4:
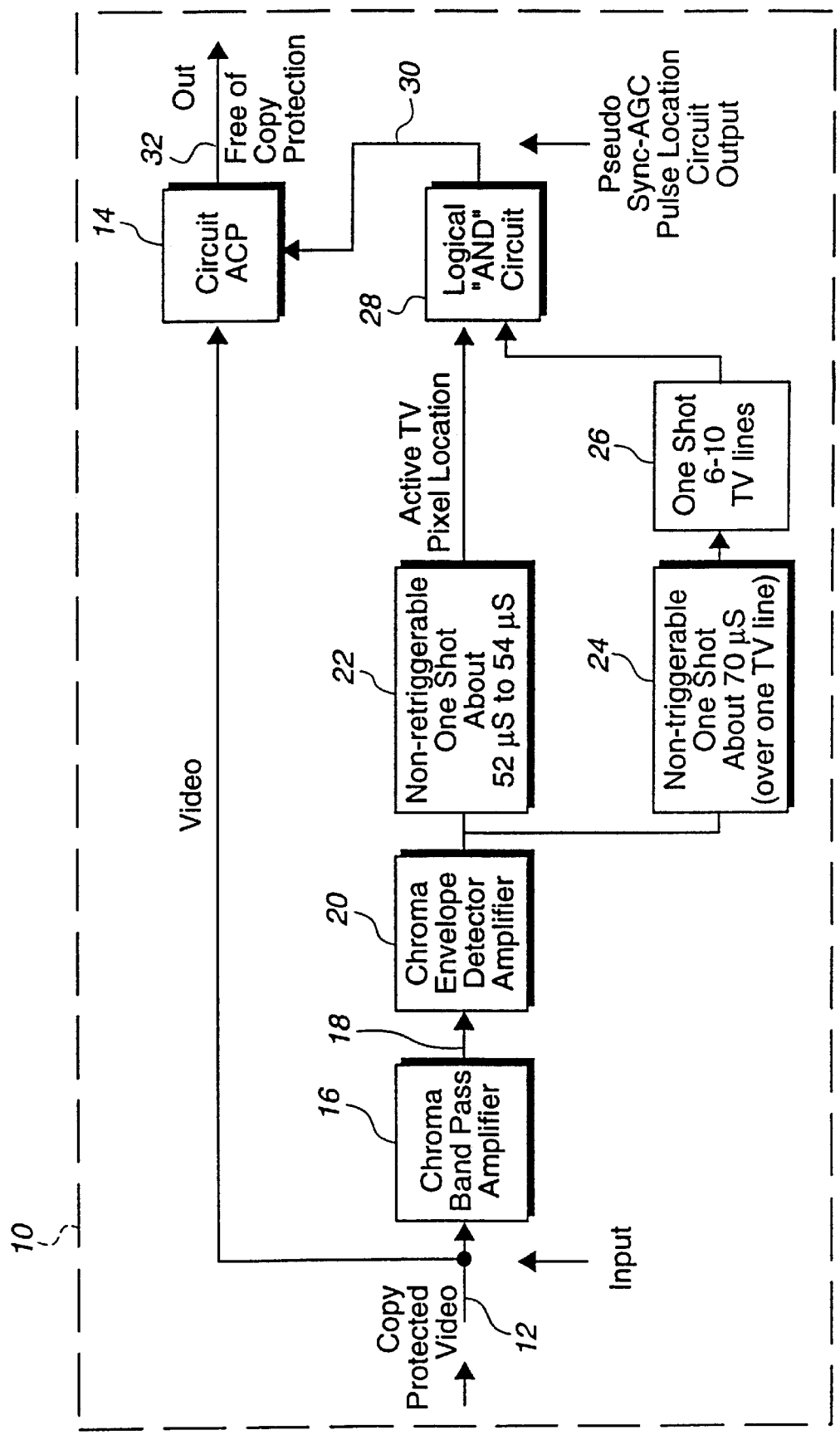
FIG. 4 shows a general block diagram of a first embodiment of the invention.

FIG. 4 is an over all block diagram of an embodiment of the invention. This embodiment comprises two primary elements. The first of these is a novel pseudo sync AGC pulse location circuit that unlike that of the '901, '965, '510 patents. The second is a "generic" Circuit ACP" that modifies the copy protection signal under the control of a control pulses generated by the location circuitry.

As discussed above, the referenced patents use the vertical and horizontal synchronizing signals within the video signal to detect the location of the copy protection pulses. The present invention senses color burst or chroma in the horizontal blanking interval to detect the copy protection pulses. As noted above, the color burst or chroma in the horizontal blanking interval signal is not present in the first nine lines of each field. The copy protection pulses are in known locations relative to the period containing no color burst or chroma in the horizontal blanking interval signals.

Each of the embodiments in the '901, 510 and '965 patents use sync separators, one shot timing circuits, logic, counters and digital line location. An embodiment as described in FIG. 4 shows a novel pseudo sync AGC pulse location circuit that unlike '901, '965, and '501 patents, does not sense sync pulses to locate the copy protection pulses. Instead the embodiment of FIG. 4 relies on color burst or chroma in the horizontal blanking interval.

Device 10 has an Copy Protected Input Video Signal 12 which is inputted to a "Circuit ACP" 14 and to a Chroma Band Pass Amplifier 16. Chroma Band Pass Amplifier 16 separates the chroma signal from the luminance signal. The Band Passed Chroma Signal 18 is coupled to Envelope Detector Amplifier 20. As shown in FIG. 1, the color burst or chroma in the horizontal blanking interval signal is missing for about 9 lines in the vertical blanking interval. The circuitry of FIG. 4 takes advantage of this. The output of Chroma Envelope Detector Amplifier 20 is coupled to Non-retriggerable One Shot 22 (timing circuit) of about 52 microseconds to 54 microseconds (less than one TV line). This insures that the output of this circuit triggers off only burst and not chroma in the active TV line and field. The output of the Chroma Envelope Detector Amplifier 20 goes also to a Retriggerable One Shot 24 (timing circuit) of about 70 microseconds (greater than one line), an interval that must be greater than 1 TV line but preferably less than 2 TV lines (less than 126 microseconds). The output of this 70 microsecond one shot is a pulse high from about line 10 to the end of the TV field (and possible high for 1 line into the next TV field). Since the AGC pulses and Pseudo sync pulses are known to be for lines 10 through 16 or 20, a 6–10 TV Line One Shot 26 triggers of the low to high transition of the 70 microsecond one shot into Logical 'AND' Circuit 28 with the 52–54 microsecond one shot output (active pixel location) that produces Pseudo sync AGC Pulse pixel and line location pulses suitable to control 'Circuit ACP' as to attenuate, clip, blank, level shift, enlarge normal sync pulses relative pseudo sync pulses, narrow and modify the copy protection pulses sufficiently as to allow a recordable copy into a video tape recorder.

Note the concepts of FIG. 4, while in the analog domain, also apply in the digital domain.

The second portion of FIG. 4 is the use of Control Pulse 30 to control the modification of the copy protection signals within Circuit ACP 14. In each of the embodiments below, the Copy Protected Video 12 is inputted to a first input of Circuit ACP as signal to be modified by Circuit ACP 14. A second input of Circuit ACP is the above mention Control Signal 30.

Figure 5:
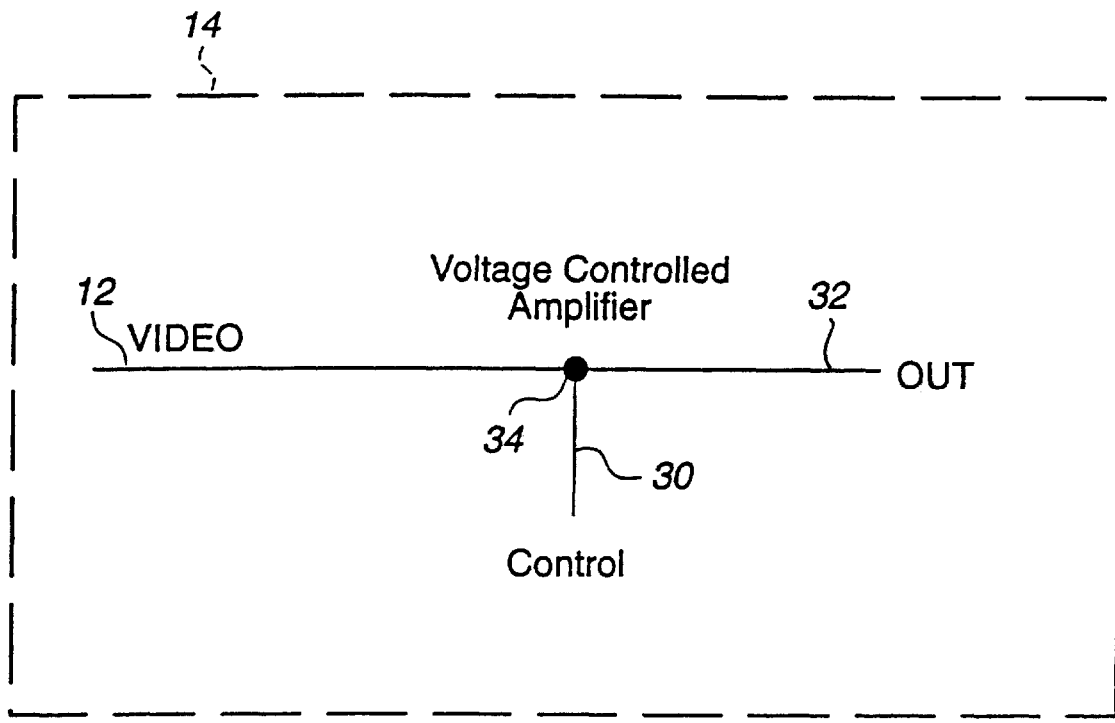
FIG. 5 shows a voltage controlled amplifier or modulator embodiment of "Circuit ACP" depicted in FIG. 4.

A first embodiment of Circuit ACP 14 uses a voltage controlled amplifier or modulator to for instance, increase the gain during the normal composite sync pulses and video outside the VBI but excluding the pseudo syncs. During the pseudo sync and/or AGC pulses the gain can be turned down. This is done via Control Signal 30. FIG. 5 shows Circuit ACP 14 with such a voltage controlled amplifier. Copy Protection Video 12 is inputted to an input of Voltage Controlled Amplifier 34. Control Signal 30 is inputted to the control element of Voltage Controlled Amplifier 34. This produces a voltage controlled output 32 that will perform the various function described above. The use of the voltage controlled amplifier is used to change the relative position of the pseudo sync pulses to the normal sync pulses (for example) as shown in FIG. 3(e) of the '965 patent (incorporated by reference). The changing of the relative position of the normal sync pulses to the pseudo sync pulses will cause a recorder to not respond to the pseudo sync pulses. This is discussed further at Column 4, lines 22–29 of the '965 patent.

Another embodiment (FIG. 6) of Circuit ACP 14 uses a switch and a signal generator to modify the copy protected added pulses. For instance if, the signal generator produces a signal representing a blanking level, the control signal can be used to replace the added pulses with a signal that allows a recordable copy. The signal generator may be used to generate any signal including random noise or a test signal, or some variations of the input signal may include a modified version (i.e. narrowed pseudo sync pulses or AGC pulses, level shifted copy protected pulses, enlarged sync pulses and/or a filtered version of the copy protection pulses may be used (i.e. bandpass, low pass, high pass) so as to produce distorted copy protection pulses. This signal would replace or modify the copy protection signals so as to allow a recordable copy.

Figure 6:
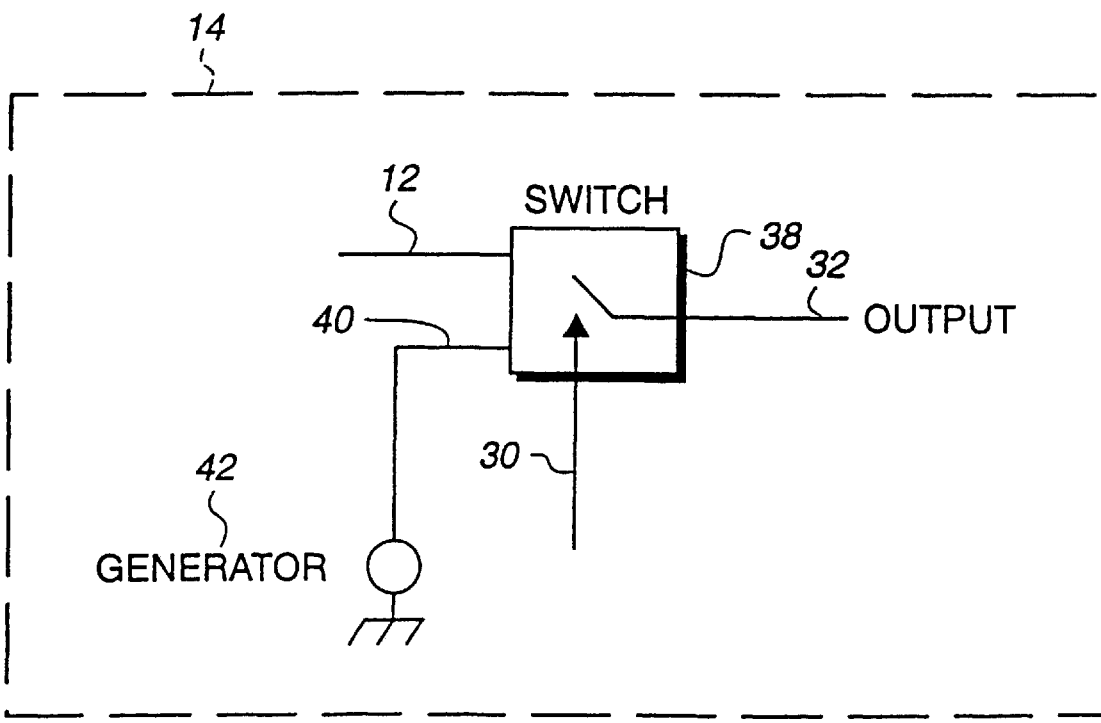
FIG. 6 shows a switch to modify copy protection pulses as another embodiment of "Circuit ACP" depicted in FIG. 4.

FIG. 6 shows Circuit ACP 14 with such a switch generator combination. Video Copy Signal 12 containing copy protection pulses is inputted to an input of Switch 38. Control Signal 30 is inputted to the control element of Switch 38.

The second signal input to Switch 38 is a Video Signal 40 which is generated by Generator 42. The use of the Switch 38 and Generator 42 replaces the Copy Protection pulses within Video Input 12 with a blanking level signal or some other signal i.e. modified part or all of copy protection signals or test signal, thus permitting a normal recording of the Video Input Signal 12 by a recorder.

Figure 7:
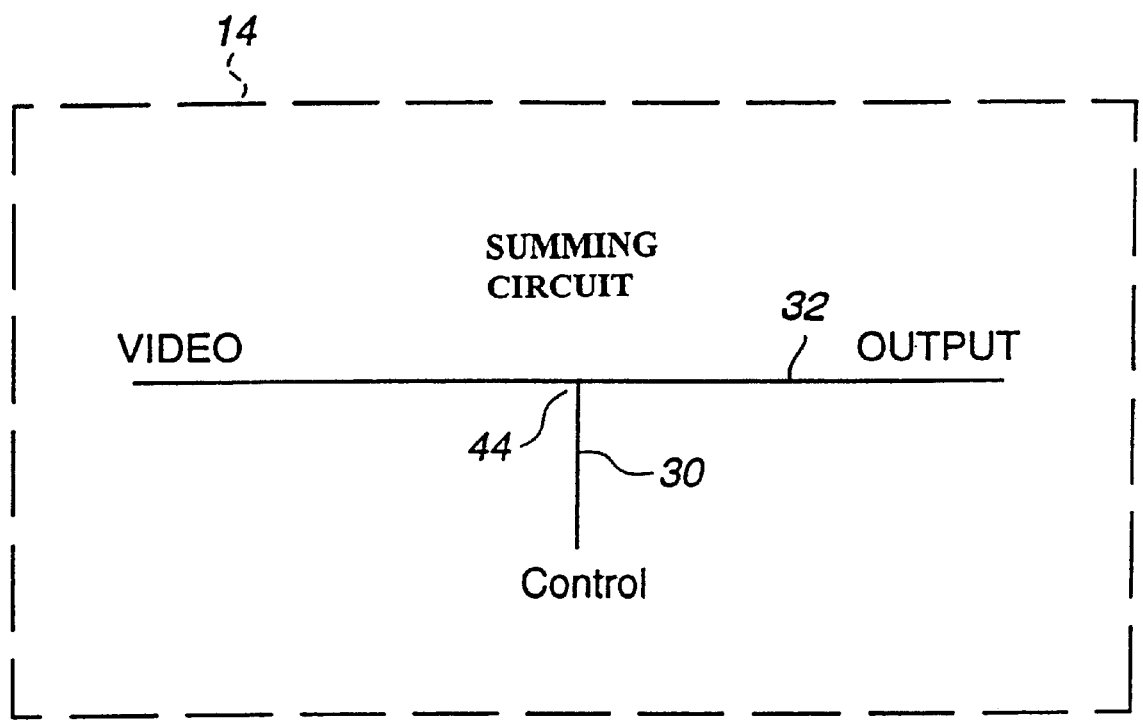
FIG. 7 shows a summing amplifier embodiment of "Circuit ACP" depicted in FIG. 4.

A fourth embodiment of Circuit ACP 14 uses a summing circuit to level shift the pseudo syncs such that the VCR's circuitry does not sense the level shifted pseudo syncs. Thus, a recordable copy can be made. Preferably there is no or little effect during the normal composite sync pulses and video outside the VBI but excluding the pseudo syncs. During the pseudo sync and/or AGC pulses the level can be turned varied. This is done via Control Signal 30. FIG. 7 shows Circuit ACP 14 with such a summing circuit. Copy Protection Video 12 is inputted to an input of a summing circuit 44. Control Signal 30 is inputted to the control element of summing circuit 44. This produces a level shifted output that will perform the various function described above. The use of the level shifting signal is used to change the relative position of the pseudo sync pulses to the normal sync pulses as shown in FIG. 3(e) of the '965 patent (incorporated by reference). The changing of the relative position of the normal sync pulses to the pseudo sync pulses will cause the AGC system within a recorder to not respond sufficiently to the pseudo sync pulses. This is discussed further at Column 4, lines 22–29 of the '965 patent.

Figure 8:
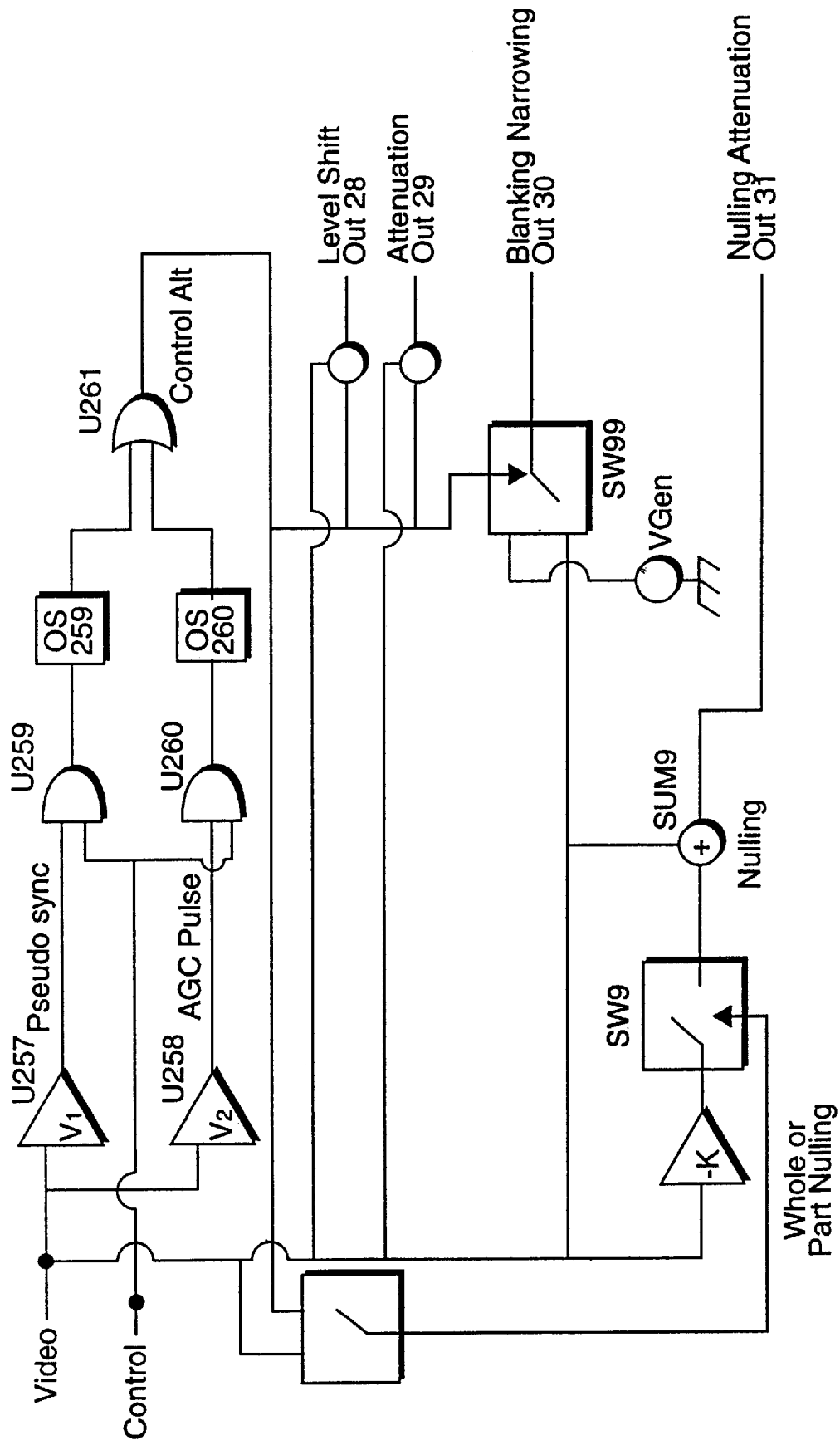
FIG. 8 shows a combination of circuits as shown in FIGS. 5, 6, and 7.

FIG. 8 shows a combination of the various Circuit ACP embodiments described above in one package. These include Summing Circuit 44, Voltage Controlled Amplifier 34 and a combination nation of Switch 38 and Voltage Generator 42 and narrowing via the Control Alt signal into SW99 and nulling (attenuation via SW9 and Sum 9. The control signal is a logic high representing at least a portion of the time when AGC and or portion of the time when AGC and/or pseudo sync pulses are on.

Other "circuit ACP" variations can be circuits that turn logic high by sensing the copy protected video's AGC and pseudo sync pulses. Then using timing generators to output pulses shorter in duration of the AGC and pseudo syncs, which in turn is used to narrow the video's AGC pulses and pseudo sync pulses. Of course the copy protection pulses may also be a combination of narrowing, attenuation, level shifting and or modification(i.e. replacement).

The embodiments discussed above have been to locate copy protection signals within the vertical blanking interval and to modify the copy protection signals as to eliminate them or make them less effective in copy protection.

The '098 and '603 patents also disclose copy protection techniques located on one or more lines within the back porch of a video signal. The general concepts of the instant invention can be used to eliminate or reduce the effectiveness of these signals.

Figure 9:
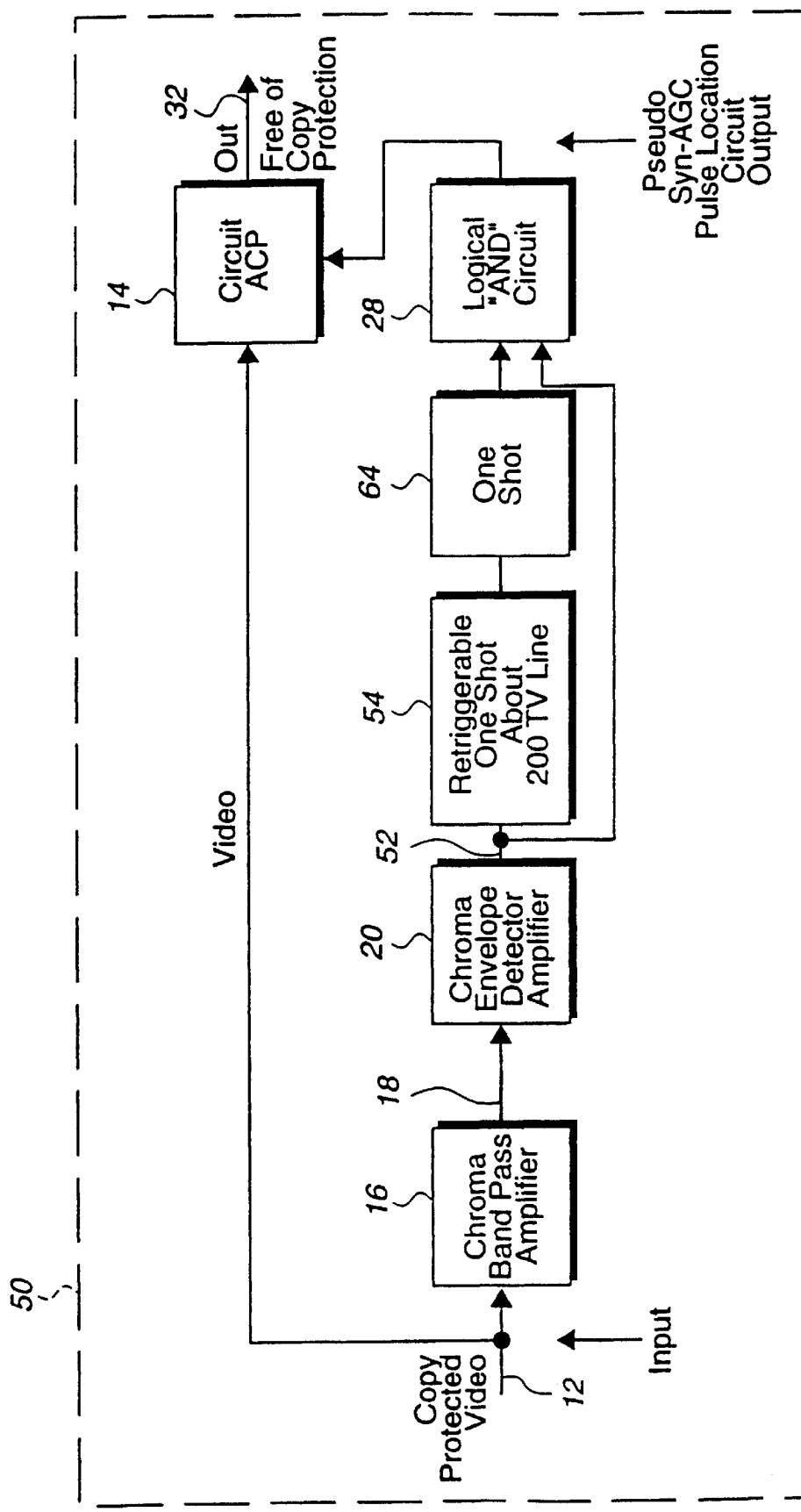
FIG. 9 shows a block diagram of a second embodiment of the invention.

FIG. 9 shows an embodiment to detect the position of the copy protection pulses as depicted in the '098 patent. A very simple example would be to couple the chroma envelope pulse from the Chroma Pulse Detector directly to Circuit ACP.

However, a more reliable method is shown in FIG. 9 in Device 50. As above, the present embodiment senses color burst or chroma in the horizontal blanking interval to detect the copy protection pulses. As noted above, the color burst or chroma in the horizontal blanking interval signal is not present in the first nine lines of each field. The copy protection pulses are in known locations relative to the period containing no color burst or chroma in the horizontal blanking interval signals.

Figure 1B:
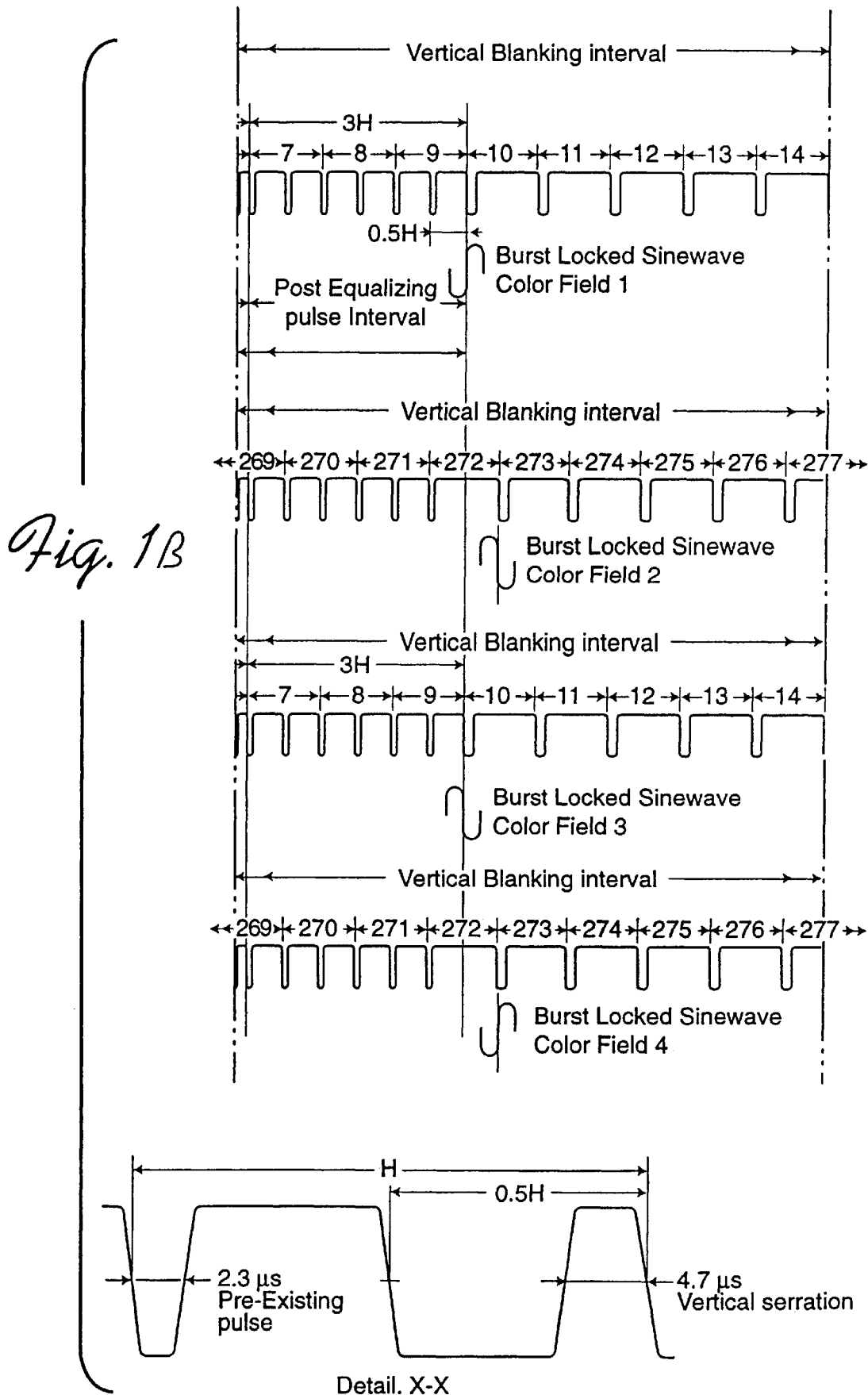
Figure 1C:
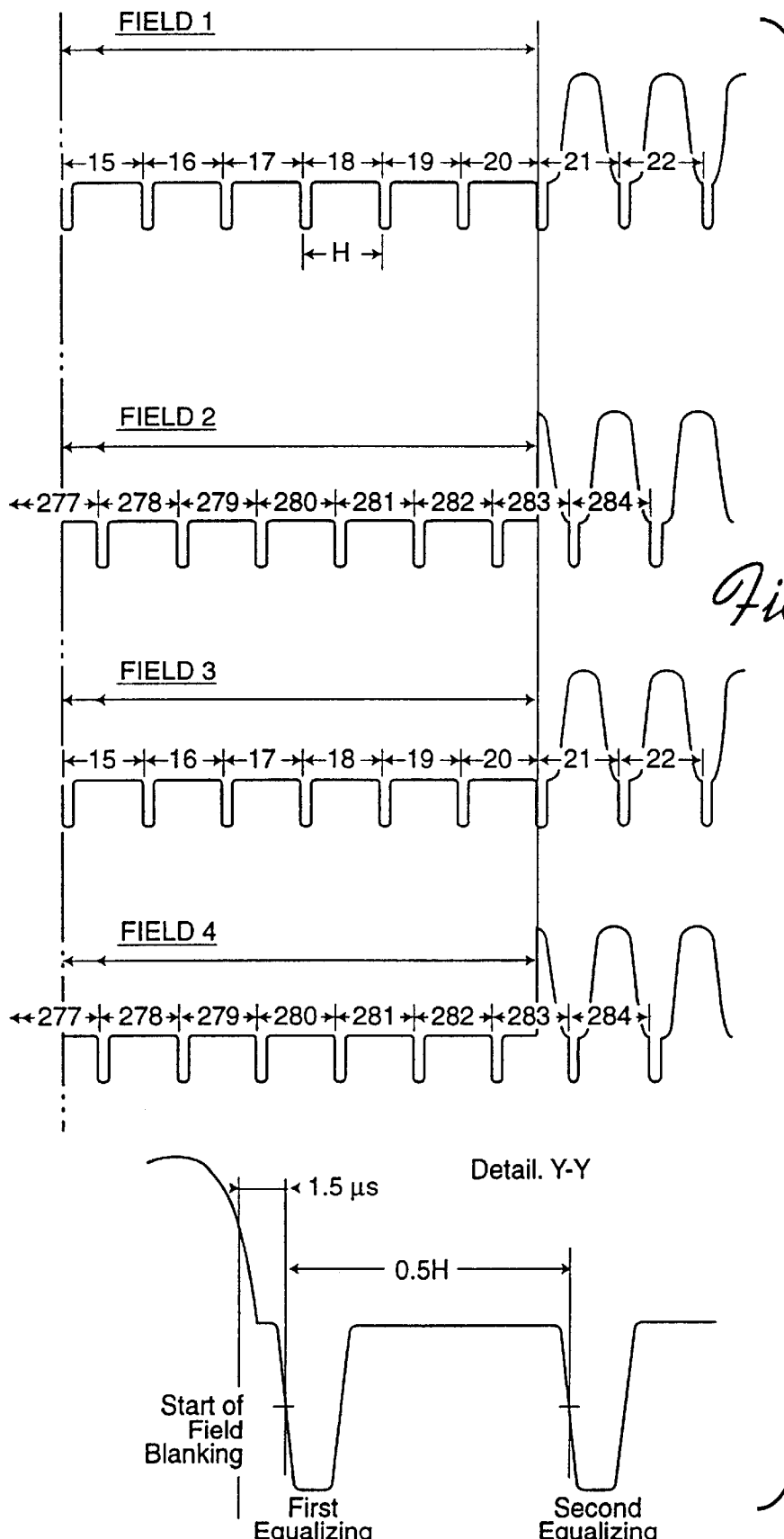

Device 50 has an Copy Protected Input Video Signal 12 which is inputted to a "Circuit ACP" 14 and to a Chroma Band Pass Amplifier 16. Chroma Band Pass Amplifier 16 separates the chroma signal from the luminance signal. The Band Passed Chroma Signal 18 is coupled to Envelope Detector Amplifier 20 to generate a Chroma Envelope Pulse. As shown in FIGS. 1A, 1B and 1C, the color burst or chroma in the horizontal blanking interval signal is missing for about 9 lines in the vertical blanking interval. The circuitry of FIG. 9 takes advantage of this. The output of Chroma Envelope Detector Amplifier 20 is coupled to One Shot 54 (timing circuit) of about 200 to 250 TV lines. A One Shot 64 triggers off One Shot 54's output to generate a pulse coincident with the pulses described in the '098 patent. These lines are, for example, the last three lines of the field. This insures that the output of this circuit triggers off the area of the picture known to have copy protection signals within the Back Porch of the video signal. The width of these pulses can be made adjustable to accommodate variations of copy protection systems that may incorporate copy protection pulses over greater portions of the picture than presently used. The outputs of Retriggerable One Shot 64 and the Chroma Envelope Detector Amplifier 20 are coupled into Logical 'AND' Circuit 28 that produces Back Porch AGC Pulse pixel to control 'Circuit ACP' as to attenuate, clip, blank, replace or level shift the copy protection pulses as to allow a recordable copy into a video tape recorder. The output of Chroma Envelope Detector Amplifier 20 is coupled to One Shot 54 (timing circuit) of about 200 to 250 TV lines. A One Shot 64 triggers off One Shot 54's output to generate a pulse coincident with the pulses described in the '098 patent. These lines are, for example, the last three lines of the field. This insures that the output of this circuit triggers off the area of the picture known to have copy protection signals within the Back Porch of the video signal. The width of these pulses can be made adjustable to accommodate variations of copy protection systems that may incorporate copy protection pulses over greater portions of the picture than presently used. The outputs of Retriggerable One Shot 64 and the Chroma Envelope Detector Amplifier 20 are coupled into Logical 'AND' Circuit 28 that produces Back Porch AGC Pulse pixel to control 'Circuit ACP' as to attenuate, clip, blank, replace or level shift the copy protection pulses as to allow a recordable copy into a video tape recorder.

Circuit ACP can be used in this embodiment to level shift the copy protection pulse, limit the bandwidth to pass only chroma or replace the copy protection pulse with a normal color burst and blanking level.

It should be noted that in each modification embodiment, only a sufficient part of the copy protection signal is needed to be modified to produce a defeat of the copy protection signals. This means a portion of the pseudo sync and or AGC pulses as described in Ryan '603 and '098, combined with a sufficient number of added pulse pairs and lines of occurrence.

This disclosure is illustrative and not limiting. All discussion in this specification have referenced the NTSC format. However, the concepts are equally applicable to the PAL and SECAM formats. Further modifications will be apparent to one skilled in the art and are intended to fall within the scope of the appended claims.

I claim:

1. A method of locating copy protection pulses within selected video lines in blanking intervals of a copy protected video signal, the video signal being formed of luminance and chroma signals including color burst, comprising the steps of:

separating the chroma signal from the luminance signal to provide a chroma envelope signal in said selected video lines;

detecting the chroma envelope signal in said selected video lines;

generating a first pulse which encompasses a location of the color burst;

generating a multi-line pulse of a duration of greater than a video line within said selected video lines; and;

ANDing said first pulse and said multi line pulse to produce a control signal representing a location of said copy protection pulses within said selected video lines.

2. A method as in claim 1 wherein said first pulse has a width less than one line.

3. A method as in claim 1 wherein said first pulse has a width of about 52 to 54 microseconds.

4. A method as in claim 1 wherein said multi line pulse has a width of 6 to 10 video lines.

5. A method of locating copy protection pulses within selected video lines in blanking intervals of a copy protected video signal, the video signal being formed of chroma and luminance signals, comprising the steps of:

separating the chroma signal from the luminance signal to provide a chroma envelope signal in said selected video lines;

detecting the chroma envelope signal in said selected video lines;

generating a first pulse which is coincident with the occurrence of the copy protection pulses in the selected video lines; and ANDing said first pulse and said chroma envelope signal to produce a control signal representing a location of said copy protection pulses.

6. A method as in claim 5 wherein said first pulse has a width of approximately 3 video lines.

7. A method of locating copy protection pulses added within selected video lines in selected blanking intervals of a copy protected video signal, the video signal being formed of chroma and luminance signals and including a color burst signal, comprising the steps of:

sensing via an envelope detector a chroma envelope signal in a horizontal blanking interval of video lines within said selected video lines in the selected blanking intervals; and generating via a timing/logic circuit a control signal in response to the sensing of the chroma envelope signal, said control signal being indicative of the presence of the added copy protection pulses in said selected video lines.

8. A method as in claim 7 wherein:

the step of sensing includes detecting the color burst signal corresponding to the chroma envelope signal, the step of generating includes generating in response to said chroma envelope signal a first pulse which encompasses an occurrence of the color burst signal and a second pulse of a duration of greater than a video line; and combining the first and second pulses to produce said control signal.

9. A method as in claim 7 wherein:

the step of sensing includes detecting the color burst signal corresponding to the chroma envelope signal;

the step of generating includes generating in response to said chroma envelope signal a first pulse which encompasses the possible occurrence of the copy protection pulses; and combining the first pulse and the chroma envelope signal to produce said control signal.

* * * * *